US008645262B1

(12) United States Patent
Cottrell et al.

(10) Patent No.: US 8,645,262 B1
(45) Date of Patent: Feb. 4, 2014

(54) SYSTEM AND METHOD FOR DISPLAYING SECURITY INFORMATION

(75) Inventors: Erik Cottrell, Cedar Park, TX (US); Mindy P Gardner, Austin, TX (US); Carolyn Cobbledick-Ridley, Piedmont, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 13/341,177

(22) Filed: Dec. 30, 2011

(51) Int. Cl.
*G06Q 40/00* (2012.01)
(52) U.S. Cl.
USPC .................................. 705/37; 705/35
(58) Field of Classification Search
USPC ...................................... 705/37, 35
See application file for complete search history.

(56) References Cited

U.S. PATENT DOCUMENTS

2005/0075966 A1* 4/2005 Duka ............................... 705/37

OTHER PUBLICATIONS

Robert W. Doty; "The Bond Buyer: The evidence mounts that continuing disclosure provides PricingBenefits for Issuers"; Bond Buyer; Jan. 11, 1993.*
Beckman, Judy K; "The ecomonic unit approach to consolidated financial Statements: Support from the financial economic literature"; Journal of Accounting Literature; 1995.*

* cited by examiner

*Primary Examiner* — Edward Chang
(74) *Attorney, Agent, or Firm* — Innovation Partners; Charles E. Gotlieb

(57) ABSTRACT

A system and method provides security information by allowing the user to choose from among tools that will be displayed to the user, some of which may be displayed in a manner that replaces a display of a different tool when the user selects it. Some tools such as a series of small charts displayed on the user's computer screen will display information regarding multiple securities, while multiple other tools display information about a single security selected by the user, for example, by the user clicking on the small chart corresponding to that security.

15 Claims, 4 Drawing Sheets

US 8,645,262 B1

SYSTEM AND METHOD FOR DISPLAYING SECURITY INFORMATION

FIELD OF THE INVENTION

The present invention is related to computer software and more specifically to computer software for displaying information about stocks and other securities.

BACKGROUND OF THE INVENTION

There is a wide variety of information available for each security, such as stocks. An investor who wishes to view such information may be required to jump from web location to web location to obtain the information they need. For example, an investor may wish to see a chart that lists historical stock prices and volumes for a given stock, and may also want to see research regarding the company corresponding to the stock. An investor may investigate the information of several securities at nearly the same time. After such investigation, the investor may wish to trade one of those securities.

Conventional web information systems allow an investor to see a fixed set of information for different securities. If all of the information is not available in one location, the investor may use several web sites to obtain the totality of the information that investor desires and to make trades. Each time the investor moves from website to website, the investor must enter the symbol of the security in which the investor is interested.

Such an approach is cumbersome and may inhibit an investor from trading. What is needed is a system and method that can provide information, tools and trading tools an investor needs to obtain information about, and make trades of, multiple securities, and provide access to that information and trading tools in an easy to use way.

SUMMARY OF INVENTION

A system and method provides for display via a network, a user customizable list of securities, and a set of small charts corresponding to prices of such securities. When a security is selected by clicking on its symbol on the list or by clicking on one of the small charts that displays a quantity of the security, a currently displayed set of tools is altered to provide the capability that each such tool provides, but for the security selected. Tools that provide information display the information about the security selected, and tools that allow trading or an activity to be performed allow trades or actions on the security selected, without the user having to enter the security to such tools.

A tool may be static, in that it remains in one place on the screen (though the perspective of the tool may be changed by the user selecting one or more tabs), or it may be non-static, selected, for example, via one of several tabs or other commands. When such a tool is selected, it replaces another tool that provided a different capability for the most recently selected security. A user may select tools from a user customizable set of tools, the tools in the set chosen by each user from among a same-sized or larger set of tools than the set of tools displayed. Some tools may be assigned to one of two or more subsets. The user may see the tools from different subsets by so indicating, and at least for some tools, an animated flip from one subset to the next may be displayed to the user, for example, to allow the user to visualize seeing each subset as a different "side" of the set of tools. The sizes and locations of each of the tools within the window that displays them, as well as the size and location of the window itself, may be selected by each user to suit their own tastes.

DETAILED DESCRIPTION OF A PREFERRED EMBODIMENT

Figure 1:
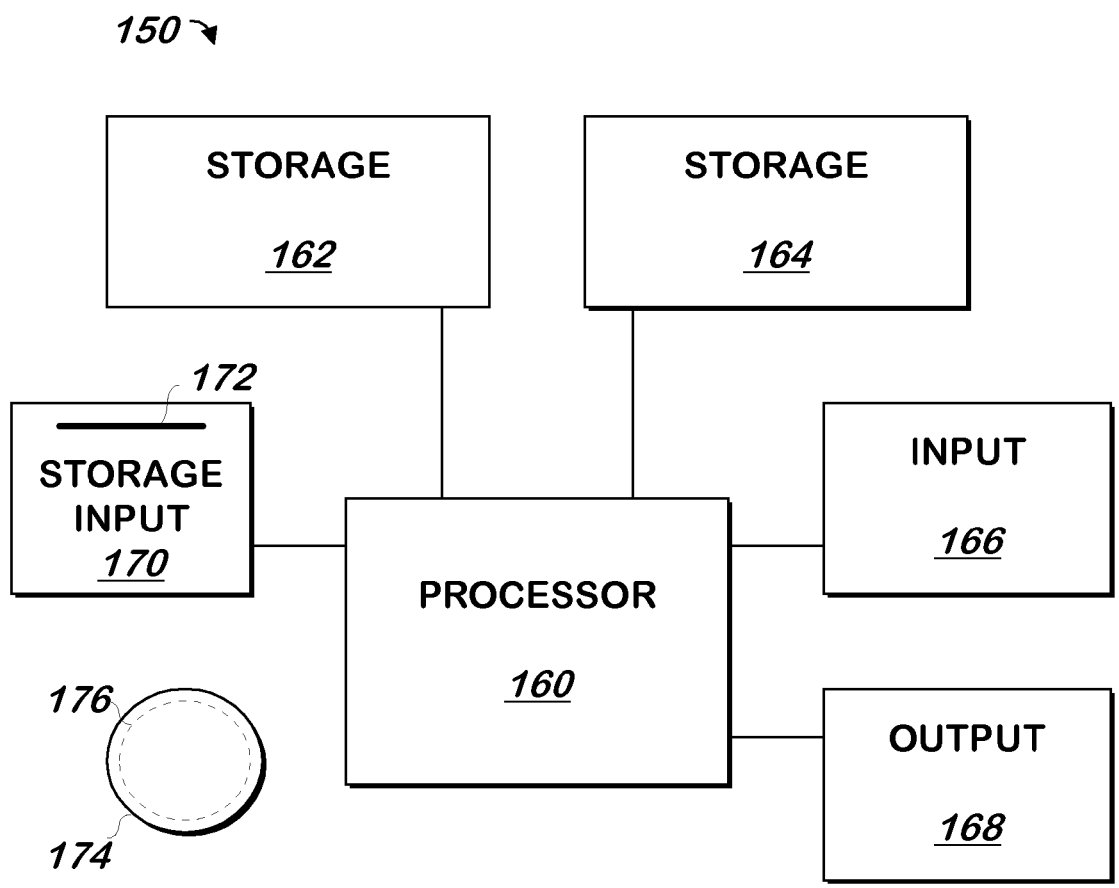
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T-SERIES SERVER running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as XP, VISTA or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
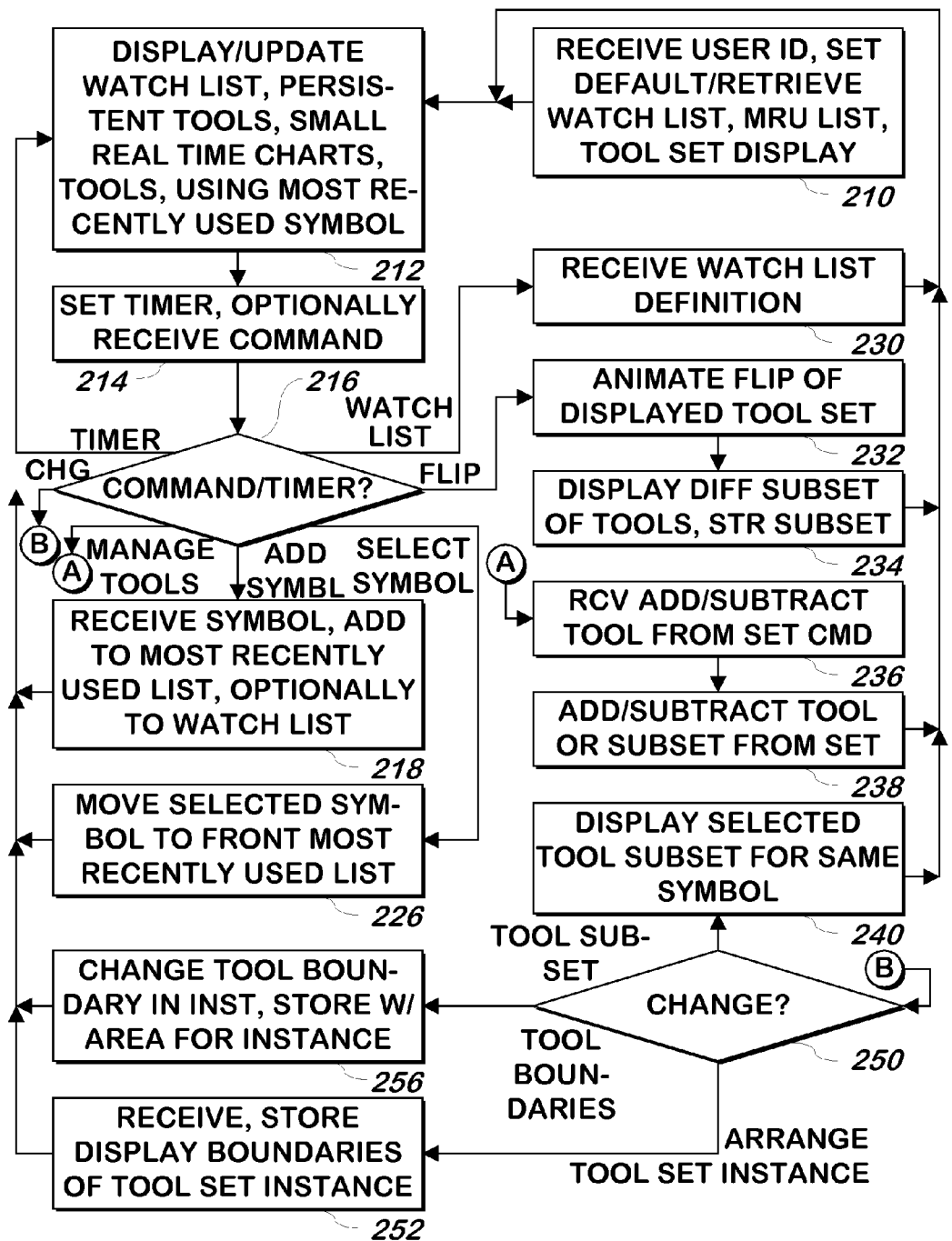
FIG. 2A is a flowchart illustrating a method of displaying securities information and providing other tools according to one embodiment of the present invention.

FIG. 2A is a flowchart illustrating a method of displaying securities information according to one embodiment of the present invention. Referring now to FIG. 2A, a user identifier is received (along with an optional password), and a default watch list and default tool set display is set if the user has not used the method before, and otherwise, the watch list, most recently used list and tool set display from the user's previous session is retrieved 210.

As described in more detail below, a watch list is a set of securities or indices in which the user is interested. The watch list contains the symbols of those securities, for example CSCO for Cisco Systems common stock. A watch list may contain the symbol for any security or index for which a symbol is available, and the default watch list may include indices such as the Nasdaq 100 index, and a few large cap and small cap stock symbols to provide the user with an example watch list. A user may specify a watch list containing any number of symbols, such as 100.

A tool provides information about, or allows an action such as a trade to be performed on, a stock or index or other security corresponding to a symbol. As described in more detail below, the tool set display is generated using user-defined information about the display, including any or all of which tools the user will have visible on their display screen, the location on the screen of such tools, and in embodiments in which multiple screens and/or tabs are used, optionally the tools available via the selection of a tab or screen.

Some or all of the watch list and small charts are displayed or updated, and the tools that are currently to be displayed as defined by the tool set display are displayed or updated, including statically displayed tools 212.

The watch list is displayed as a list of the symbols that were either initially provided or amended by the user (by adding or removing symbols). Current or nearly current prices of the securities on the watch list may be displayed along side the symbols on the watch list. Symbols in excess of those that will fit in the area identified for the watch list may not be displayed, though a conventional scroll control may be provided to allow the user to adjust the window of symbols that are currently displayed. In one embodiment, the watch list is considered to be a tool, which may be positioned, sized, and even added or removed from the displayed set of tools according to user specifications as described herein and below.

In one embodiment, small charts are displayed along the bottom of the screen for each of the first watch list items that appear in the first N position of a most recently used list. A most recently used list is a list of symbols sequenced in order of when the symbol was most recently added to the watch list or otherwise selected by the user, and may be integrated with, or related to, the watch list. The charts contain pricing information, volume information or both, and will appear at a size that will allow more than two or four or six or eight of them to appear along the bottom of the screen, but fewer than ten of them will fit along the bottom of a 20" LCD screen. In other words, they are large enough to be readable, but not large enough to show significant detail. The information in the charts is also provided or updated as part of step 212.

In one embodiment, the charts are displayed in an order. The order is, from left to right, the chart corresponding to the symbols on the most recently used list.

When a different symbol is selected as described below, the small charts are displayed according to the new order of the most recently used list. This can cause a reordering of the small charts that were previously displayed without removing a small chart or adding a small chart to those displayed in the first N positions that include the newly selected symbol. For example, if the third of four displayed charts is selected, then that selected chart will be displayed first, with the charts that had previously preceded the third chart moving one position further to the right. Alternatively, a chart may move from a position that had been "off the screen" (i.e. not displayed) when the first N charts had been displayed, to the first position, with all but the last previously displayed chart shifting one position to the right and the last previously displayed chart moving to a position off the screen when the first N charts are displayed. In one embodiment, whenever a symbol is selected or added, the display of the charts scrolls fully to the left, showing the first N charts so that the chart corresponding to the most recently selected symbol is always displayed on the screen.

In one embodiment, charts that do not fit onto the screen may be displayed using conventional scroll controls to move a window of displayed small charts to include less recently used or more recently used charts as the user operates the scroll control, in a conventional manner.

In one embodiment, some securities such as mutual funds do not set prices in real time. In such embodiment, pricing information in the watch list and the small charts are only updated when new pricing information for the security is available from that which was previously displayed. In one embodiment, mutual funds are not part of the securities that may be used as securities, as described herein.

As noted, the tools chosen by the user for display are displayed in accordance with the user-defined locations as described below. Some tools are arranged as subsets, and when one tool of a subset is selected by the user, for example, via one of several tabs identifying the tools in the subset, the display of the newly selected tool replaces the previously displayed tool from that set.

In one embodiment, the tools that are defined in the tool set display and displayed as part of step 212 include one or more static tools. Static tools are displayed for the currently selected security, but are not replaced when one tool replaces another tool in the display, nor when one tool subset replaces another in a flip as described in more detail below. The static tool or tools are displayed for the most recently selected security, so that when a different security is selected, the static tool or tools are displayed for that security. In one embodiment, the static tools allow the user to trade the security, options for that security or arrange conditional orders for the security, such as a purchase at a price at or below an entered price or a sale at a price at or above an entered price. In one embodiment, the watch list itself is displayed, with nearly current prices or values for each security or index in the watch list, and such prices are updated as part of step 212.

In one embodiment, the display of information and receipt of information described herein is performed over a network, such as the Internet.

A timer is set and a command may be optionally received 214. If the timer elapses before a command is received 216, the method continues at step 212.

If the command received is a command to add a symbol 216, the symbol is received, added to the front of the most recently used list (with the other symbols on that list being pushed behind it in the same order, relative to each other, that they had before), and optionally added to the watch list 218. The tool or tools that were visible prior to the command being received are displayed (and can be operated) using the newly added symbol 220 and the method continues at step 212.

In one embodiment, a symbol may be added to the most recently used list with or without adding it to the watch list: if the symbol is not added to the watch list, the added symbol is used to change the displayed tools and small charts to operate with that symbol, but the watch list is not changed. In one embodiment, a symbol may similarly be added to the watch list without adding it to the most recently used list. The two lists may operate entirely independently of one another.

If the command is a command to select a symbol 216, the selected symbol is moved to the front of the most recently used list 226 and the method continues at step 212. A user may select a symbol in any of several ways, some of which will now be described.

A user may select a symbol by clicking on the symbol in the watch list or by clicking on the small chart corresponding to the symbol. A user may select a symbol by entering the text of the symbol either to the watch list or in a text box that does not add the symbol to the watch list but otherwise behaves in the same way as if the user had selected the symbol from the watch list if such symbol had been on the watch list. In one embodiment, some tools may display other symbols as links and if the user clicks the link, it has the same effect as if the user had entered that symbol in the text box without adding it to the watch list. In one embodiment, a user may see the last N symbols selected by clicking on a parent menu item and such symbols are displayed as drop down menu items under that parent, and the user may select a symbol by selecting that symbol from the drop down menu items.

Switching between subsets of one or more tools is performed via a flip command, which may be performed by the user clicking a button, though a tab, link may be used. If the command is a flip command 216, a different subset of tools is displayed by the portion of the screen containing the currently—displayed subset appearing to flip, via an animation, to provide the appearance of the page or a portion of the page having two or more surfaces, such as a front side and a back side, and the animation shows the user that the screen or a portion of the screen is moving to reveal the different surface containing the newly-selected subset 232. The new subset of tools corresponding to the command are displayed 234, and the method continues at step 212.

In one embodiment, the tool within the newly selected subset of tools displayed on the newly appearing surface is the last one that had been selected by the user for that subset. To facilitate this capability, the previously selected tool within the sub set of tools displayed before the flip is stored, associated with that sub set of tools, as part of step 232. When step 232 is performed, if a tool identifier is stored associated with the subset of tools to be displayed after the animated flip, that tool is displayed after the flip. In one embodiment, the watch list, small charts and one or more static sets of tools will remain displayed in a different portion of the screen used to display the subsets of tools both before and after the animated flip, and in another embodiment, the remainder of the screen, except for the watch list and the small charts, is replaced by the tool displayed after flip and in another embodiment, less than the remainder of the screen is replaced by the tool displayed after the flip. In one embodiment, the subset of tools last selected by the user via a flip is stored associated with that user as part of the tool set display so that the same subset will be displayed after the user logs out and then logs back in by providing their user identifier as part of step 210.

If the command is a command to manage tools 216, a command is received to add or subtract a tool or subset of tools from the set of tools that can be displayed 236. The tool indicated with the command of step 236 is added to, or subtracted from, the subset to which that tool corresponds, or the subset is added to the displayed set of tools 238 and the method continues at step 212. The display of the tools in the subset to which the tool corresponds will either have the newly added tool (the tool not having been displayed in the prior display of the tool set at step 212) if the tool was added, or will cease to have the tool displayed (the tool having been displayed in the prior display of the tool set at step 212) if the tool was removed.

In one embodiment, some of the non-static tools may be accessed via tabs or links. When a tab or link is selected to change the display of a tool, the tool corresponding to that tab or link replaces the tool that had been displayed that corresponded to a different tab or link, with the newly displayed tool operating on the most recently selected symbol matching the symbol used by the other displayed tools. The display of still other displayed tools (other than the replaced tool) may be unaffected by the change. In one embodiment, the user may define subsets of tools and add or subtract tools to or from the subset. When a tool in a subset is selected, the display of that tool replaces the display of the previously selected tool in the same subset.

If the command is a command to change in any of the ways described in more detail below 216, the method continues at step 250. If the command was a command to change the displayed tool to another tool in the same subset as a displayed tool 250, an indication of the tool is received as part of the command, and the indicated tool is displayed 240 operating for the security for which the previously displayed tool was displayed, and the method continues at step 212 with the currently selected tool being displayed until a change is indicated as described herein. In one embodiment, the command is received by clicking on a tab corresponding to the tool and subset. In one embodiment, the tool replaces on the display screen a previously displayed tool, though other tools may remain displayed as the indicated tool displayed is changed as described herein.

If the change is a change in the size of a tool 250, the new boundary of the tool or subset is received, for example, by the user dragging the boundary of the tool or subset, the displayed size of the tool is altered as indicated by the user, and the size of the area in which the tool is displayed and the location of the upper left corner of the tool, relative to the upper left corner of the screen, is stored 256. In one embodiment, other tools or subsets that replace the altered tool will use the same newly-specified area when they replace that tool. The area in which the tool or other tools are displayed will remain at that size until changed as described herein. The method continues at step 212.

In one embodiment, one or more instances of the method of FIG. 2 may be simultaneously performed. If the change is a change to the boundaries of the window in which the tool sets are displayed 250, the boundary is received and stored for that instance 252 and the method continues at step 212, where the display described herein will be performed using the latest boundary stored. In one embodiment, the window includes tool display areas, statically displayed tools, the watch list and the small charts.

In one embodiment, non-static tools, the static tools, small charts and other tools are provided by the server to the client for simultaneous display on a single computer screen. Other embodiments may allow some of the tools to be displayed on one computer screen and other tools on another computer screen. In one embodiment, information that will allow the client to display the tools is provided from the server to the client.

Example Operation.

Figure 2B:
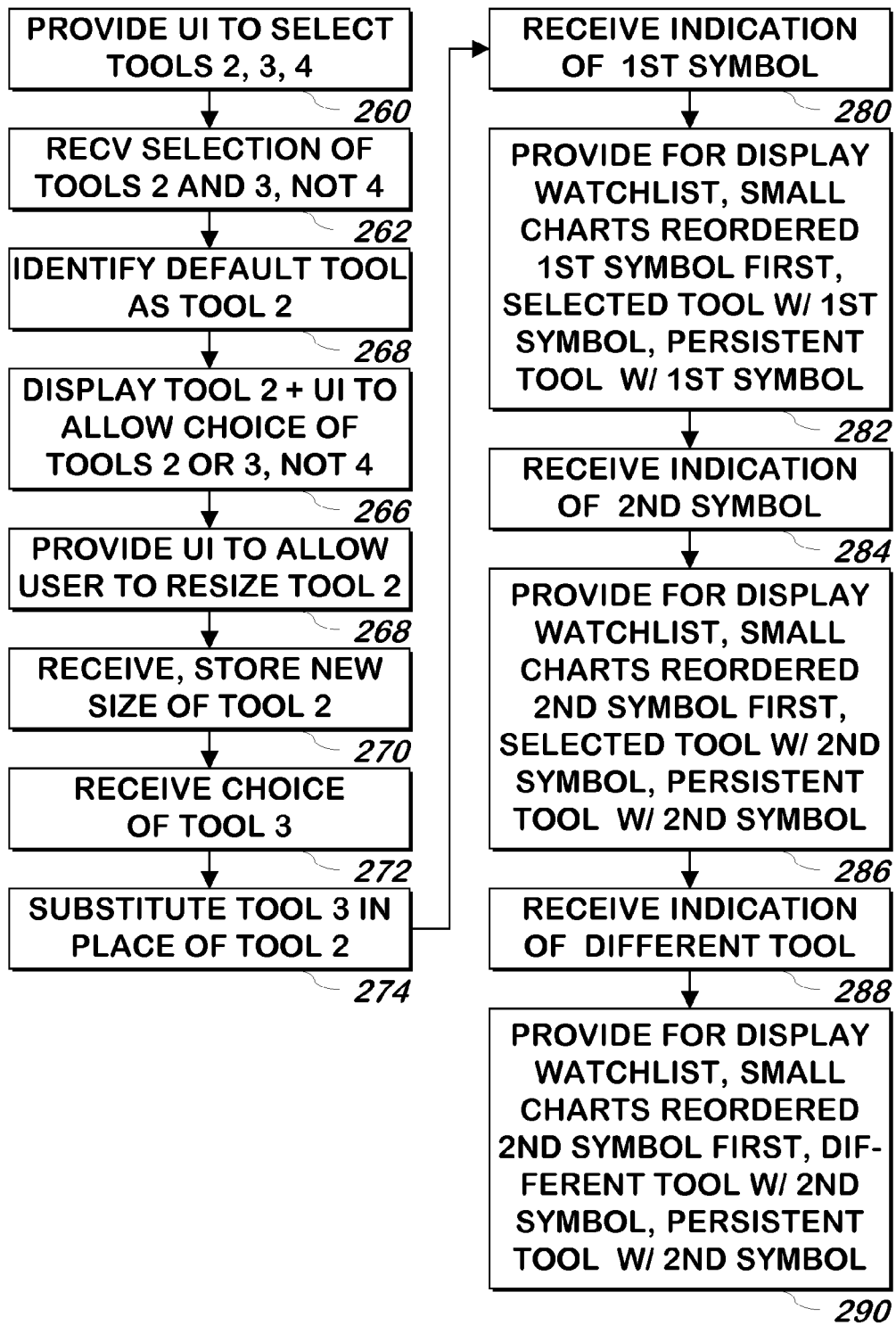
FIG. 2B is a flowchart illustrating a sample use of the method of FIG. 2A.

Using the method of FIG. 2A, an example operation may be described. The example will be described with reference to FIG. 2B, which illustrates an example operation of the method of FIG. 2A according to one embodiment of the present invention. Referring now to FIG. 2B, the user may select which tools will be on a list of tools from which they can choose to see, and a user interface is provided 260 to allow the user to select from tools 2, 3 and 4 (the small charts will be considered tool 1 for the purpose of this example). The user selects tools 2 and 3, but not 4, and such selections are received 262.

The user may then choose any of the tools previously selected, but not those which are not previously selected. The selection may be made by the user, and by a system administrator who identifies a set of default tools. For purposes of example, the default tool may be identified 264 as tool 2, and so that tool may be displayed 266 with a user interface that allows the user to choose tool 2 or 3 but not tool 4. The user may resize the displayed tool 2 268, and the resize command is received and the display updated to reflect the new size and the size is stored 270. If the user uses the user interface and chooses tool 3, the choice is received 272 and tool 3 is substituted 274 in place of the previously displayed tool 2. A tool 5 may be selected and is either specified by the user as a static tool, or it is always considered a static tool when selected. As the user chooses tool 2 or 3 which may be alternatively displayed in one area of the screen, the display of static tool 5 will not be affected. It will always be displayed in a different area of the screen.

Whenever a tool is displayed, a user interface is provided that allows the user to resize the tool or the window in which the tool is displayed.

The user may select a first symbol, by clicking on a symbol link on the watchlist or the set of small charts running along the bottom of the screen. The "first" symbol is the first one selected, and may be any symbol on the watchlist or displayed using the small charts. Selection may be made by clicking the symbol on the watchlist or clicking on the small chart for the desired symbol.

The server receives 280 an indication of the first symbol the user thus selected, and provides 282 for display (e.g. via a web page or via a user interface of a program or via any other conventional method) the watch list, the small charts, reordered to show the small chart for the first symbol moved to the first small chart position on the left, and the other small charts that had been to the left of the selected chart before it was selected, moved one position to the right. Alternatively, the server may provide information for the client computer system to update a previously produced or received page. All currently visible tools display and/or operate using the information for the selected first symbol corresponding to that tool. For example, the user may specify an amount of a security to purchase using a static tool and the security purchased will be the security corresponding to the first selected symbol.

If the user selects a second symbol, either via the watch list or the small charts, the server will receive 284 an indication of the second symbol selected, via conventional techniques. The following is provided for display 286: the watchlist, the small chart for the selected symbol, moved to the leftmost chart position, with those that were to the left of the small chart for the selected symbol before such selection repositioned one small chart position to the right, and the tool or tools displayed before such selection of the symbol changed to show and/or operate on, the information for the selected symbol that corresponds to that tool. The web page may be provided by the server to the client, or information to update the previously displayed web page may be provided by the server to the client and the client may update the page using such information.

Web pages are described herein as the user interfaces of the present invention. However, in another embodiment, a conventional application user interface may be used in other embodiments.

If the user chooses a different tool, for example via a tab on the web page, the server will receive 288 an indication of the different tool chosen, via conventional techniques. The following is provided for display 290: containing the watchlist, the small charts as provided in step 286, and the different tool operating using the second symbol (and replacing a previously displayed tool that has been operating using the same symbol), and any other displayed tool also operating using such symbol as provided in step 286.

Thus, the user can move in several degrees of freedom. Symbols may be selected and the currently selected tools operate for that symbol. A different tool may be selected and the different tool operates using the most recently selected symbol. The small charts, watch list and any static tools are displayed in both cases, though the small charts will change position (in addition to being repeatedly updated) and any static tools will operate using the most recently selected symbol.

Optional Enhancements.

In one embodiment, a significant change in value of one of the small charts causes that small chart to briefly be displayed in the center of the screen.

In one embodiment, a significant change in value displayed by any one of the small charts causes the operation of the system and method to act as though the small chart had been selected by the user as described above. If such an automatic selection is made, the display of each tool may be altered in this situation to alert the user that the symbol being operated by each tool has changed, for example by highlighting the tool, and highlighting the small chart, which may have been changed to move into the leftmost position relative to the other small charts.

In one embodiment, the user may identify a threshold change in a value corresponding to the security, such as price or volume that will trigger such selection. The threshold may be different in different directions, such as up or down, or may correspond to multiple trigger points, such as the different strike prices of options in which the user may have positions.

In one embodiment, before such selection is made, the state of the display is saved so that the user may press a key to go back to the state of the prior display, in which case a different security had been selected. In one embodiment, such a button is also available if the user selects a symbol by clicking on a watch list symbol or one of the small charts.

Enhancements for Mobile Devices.

In one embodiment, there are two or more sets of tools that the user may add to or subtract from as described above, and step 236 includes designating the set to which the tool is being added to or from which the tool is being subtracted. For example, one set is for use on conventional browsers and another set is for use on mobile browsers. In such embodiment, the user could have a mobile browser set of tools that has a relatively small number of tools and a conventional browser set of tools that has a larger number of tools. As the user adds or removes tools as described above, an identifier of the tool is saved not only associated with the user identifier of the user, as would be performed above, but the identifier of the tool is also stored associated with the platform. The platform identifier may be retrieved using conventional techniques at the time the user logs in.

In one embodiment, not only are the tool identifiers stored associated with the user identifier and platform, they may be stored with an instance identifier of the platform, such as an IP address. The tools displayed are those that correspond to the user identifier, platform and optionally instance, being used by the user for the display. Thus, the list of tools is stored for each device the user may use, and the tools specified while using that type of device are displayed to the user when the user uses that type of device.

In one embodiment, the tools themselves have two or more versions: for example, one version for mobile browsers that has a compact form than the version for conventional browsers. The mobile browser version may omit some information or capabilities that the conventional browser version has, though some of the information for each version of the same tool is the same or very similar. Step 212 includes identifying the type of browser using conventional techniques, and displaying the version of the tool according to the type of browser. A table of browser types and tool versions may be used to select the version of the tool that most likely corresponds to the user's browser. Thus, a user using one device may see one version of one set of tools and the same user using a different device may see a different version of a second set of tools. The browser type may be received when the user logs in as part of step 210. As the user makes changes as described herein, the user's settings described herein (e.g. selected tools and their sizes and positions, watch list, etc.) may be stored associated with the user identifier the user provides at step 210, and such information is used to perform the steps described herein, including step 212.

In one embodiment, the small charts are displayed differently on a mobile browser, for example, by displaying only one or two of them at a time, and cycling through a subset of the small charts in the first L positions of the most recently used list, so that a first one is displayed, then a next one, then a next one until all L have been displayed, then cycling through the display of small charts for the first L most recently used symbols again. In another embodiment, the small charts are displayed as described above, with only one or two displayed at a time and the user can scroll among them. In one embodiment, the user may elect between one or the other of these behaviors.

Enhancements for Mobile Devices with GPS.

In one embodiment there are multiple watch lists, and step 218 includes designating which of several watch lists to which the symbol should be appended. For example, the user may have a watch list labeled "home" and another labeled "work". A possible command received at step 214 is a command to define the watch lists, and if such a command is received 216, watch list definition information is received 230, and the method continues at step 212. Watch list definition information may include the name of the watch list and the location at which the watch list is effective. Thus, the user may define the coordinates of his work place and associate it with the watch list labeled "work". A watch list may be defined to be the default watch list to be used if the user's location is other than within a threshold amount of a location associated with the other watchlists for that user.

If the user is using a mobile browser, every minute, step 212 includes obtaining the user's coordinates (for example, on an IPHONE from Apple Corporation of Cupertino, Calif., one may obtain the coordinates using the conventional core location framework) and comparing them to determine if the coordinates are within a threshold amount of a location defined for a watch list, and if so, that watch list is displayed and the method described herein operates on that watch list, and otherwise a default watch list is used. This means that as the user moves their mobile device from a location having coordinates outside the threshold amount away from a location associated with a watch list to a location having coordinates inside the threshold amount away from a location associated with a watch list, the watch list will change, and display of the small charts will also change to those symbols on the watch list. Thus, as the user moves, the symbols on the watch list displayed may change, with some symbols being added, other symbols being removed. In one embodiment, an alert is sent to the user indicating the watch list changed.

The user may also use the defined watch list information to redefine a different watch list if the user wishes to override the location based selection until the user turns the override off, also via the define watch list command, and such definitions are received and acted upon as described herein as part of step 230. For example, the user may indicate that he or she wishes to go back to the prior watch list and such request is performed. In one embodiment, if the user is entering information into a field in one of the tools, or if a threshold amount of time has not yet passed since the user last selected a symbol, the watch list will not automatically change as described above.

In another embodiment, a user may define different watch sub lists to be applicable to different times of day ranges, as defined by a start time and an end time for that sub list. The different times of day may each correspond to times at which different markets are open for example, and such time ranges for one sub watch list may overlap with other time ranges of one or more other sub watch lists.

The symbols for financial instruments corresponding to any applicable watch list are considered to be on the watch list of the user for operation as described above if the current time is within the defined time range.

System.

Figure 3:
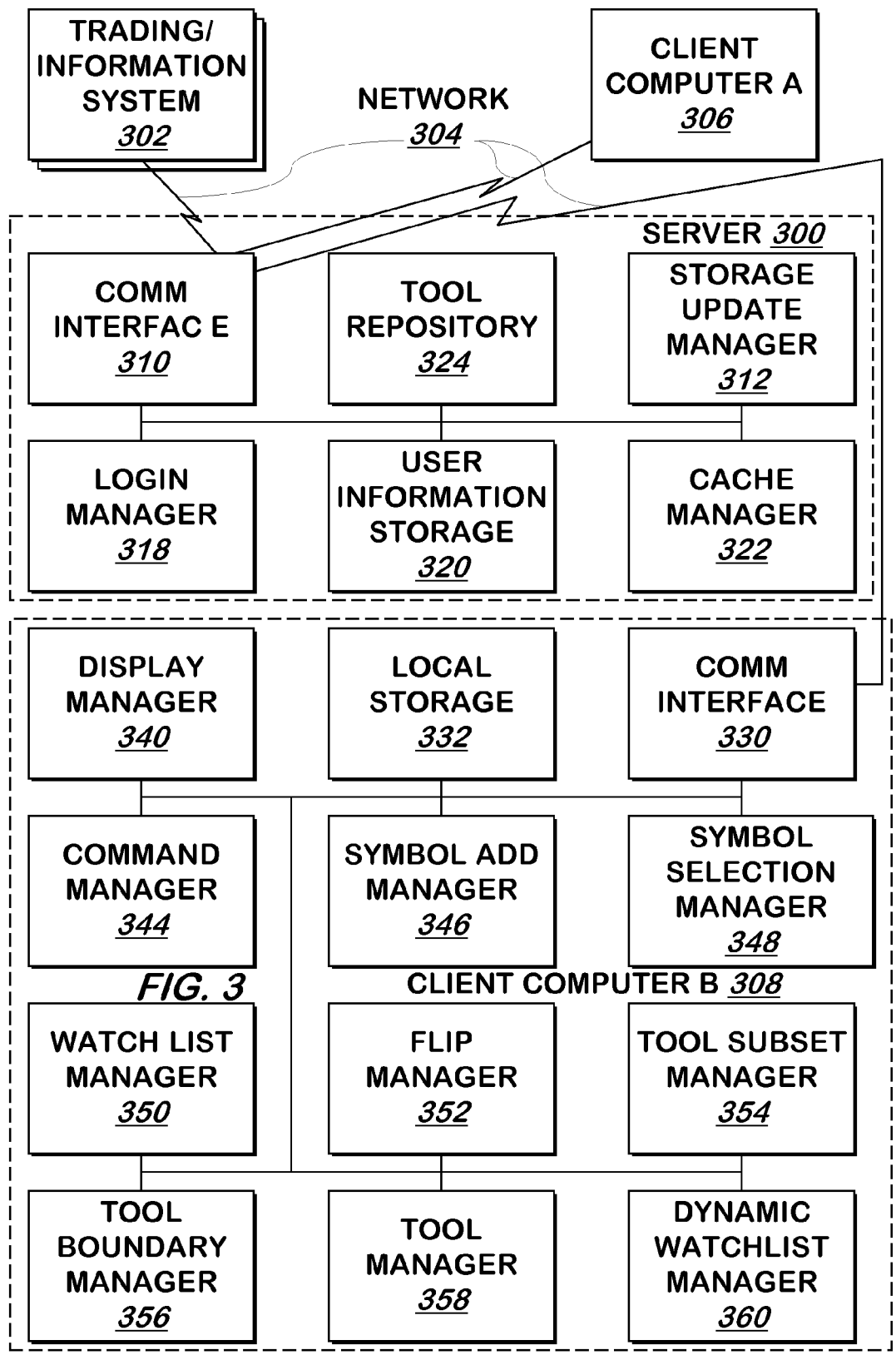
FIG. 3 is a block schematic diagram of a system for displaying securities information according to one embodiment of the present invention.

Referring now to FIG. 3, a system for displaying securities information is shown according to one embodiment of the present invention.

Client computer A 306 and client computer B 308 include conventional computer systems such as a personal computer or cellular telephone and are coupled to server 300 via a network 304, which may include one or more Ethernet networks, the Internet, or both. Client computers A and B 306, 308 are used by different clients to communicate with server 300 as described herein. Client computers A and B 306, 308 have a similar or identical structure, though only client computer B 308 is described in detail below, and there may be any number of client computer systems.

Trading and information systems 302 provide conventional securities trading functions such as those provided by a conventional exchange and/or provide conventional trading information, such as securities prices, securities analysis such as research reports and so on, and some or all may initiate or perform securities trading.

Server 300 is a conventional web server and may be made up of one or more different conventional computer systems. Server 300 operates as will now be described.

In one embodiment, some or all of the elements of server 300 instead reside on the user's computer system as part of a conventional application.

Communication interface 310 includes a conventional TCP/IP-compatible communication interface, running suitable communications protocols. All communication into or out of server 300 is made via one or more input/outputs to communication interface 310.

Users register a username and password with, and log in to, log in manager 318 via web pages provided by log in manager 318 via a browser on the respective client computers 306, 308 using conventional techniques, or by using conventional applications running on the respective client computers 306, 308, server 300 or parts of applications on client computers 306, 308, with the remaining parts of the application residing on server 300. Log in manager 318 stores the user identifier and password into user information storage 322. When registered or logged in, log in manager 318 issues a session identifier for the user and stores it into user information storage 322 and stores a cookie on the user's computer system containing encrypted versions of the user identifier and session identifier, or the user identifier may be stored as part of the application or portion of the application on the user's computer system. Log in manager 318 may also or instead provide such encrypted information to display manager 340, which stores it into local storage 332.

Each time a different element of server 300 performs the functions described below, it will read the cookie or otherwise receive or retrieve the encrypted information described above, decrypt the session identifier and user identifier and compare it to those stored in user information storage 322 using conventional techniques, and perform the functions based on information previously stored for the user. When the user registers, and subsequently, each time the user logs in via log in manager 318, log in manager 318 causes the user's browser to request a web page from log in manager 318 (the web page containing elements 340-360 described herein) or signals display manager 340 to begin operation.

In one embodiment, the web page contains some or all of the elements 340-360 shown in computer system B 308. In another embodiment, these elements are part of a downloaded computer program and in another embodiment, these elements are separate pieces of computer hardware.

Communication interface 330 may be a conventional TCP/IP-compatible communication interface running suitable communication protocols, such as TCP/IP and Ethernet. Communication interface may include a conventional keyboard/monitor/pointing device (e.g. mouse or touchscreen) interface and software coupled to a keyboard/monitor/pointing device combination (not shown). All communication to and from client computer B 308 may be made via communication interface 330. Client computer A 306 may have the same or similar elements 330-360 described herein.

When such a web page is received and installed, display manager 340 retrieves from user information storage 320 via cache manager 322 any display objects (that define the tools the user will see and their locations and sizes) used previously (or a default display object if this is the first time the user has used the system), watch lists and optionally the most recently used list and stores this information into local storage 332. Display manager 340 retrieves the tools specified in the display objects from tool repository 324 and stores them into user information storage 320. Display manager 340 requests from cache manager 332 the dynamic data (e.g. price, volume, etc.) associated with each of the securities on the watch list for the user that is located in local storage 332 and any other dynamic data used in the tools and provides the display of tools, which includes the watch list and small charts as described above. Local storage 332 includes the memory or disk storage of client computer 308 arranged as described herein. Local storage 332 may contain a conventional database.

Each of the tools displayed may comprise text using a markup language or a computer program such as a JAVA Applet, FLASH Movie or Windows Presentation Foundation.

As part of the initial display operations described above, display manager 340 downloads each tool specified in the display object or objects as described in more detail below, and then, for each tool, either displays the tools or makes the dynamic information for the symbol at the head of the most recently used list as well as other dynamic information they require, available to the tools used by that user as defined in the one or more display objects and causes them to display their respective tools.

In one embodiment, display manager 340 periodically such as every fifteen seconds) rerequests the dynamic information (e.g. stock prices and volume) that it displays, and display manager 340 repeats the display of the various tools as described above. If the tools are programs, such information may be made available or pushed to them, by display manager 340. When display manager 340 updates the display as described herein, it may signal any programs to update themselves.

Cache manager 322 internally maintains an updated cache of such information received from trading information systems 302 and fulfills requests for such information from that cache, which may be made of memory or disk storage and may contain a conventional database. Cache manager 322 determines which information to maintain in its cache based on requests it receives from display manager 340. For example, if it doesn't have certain requested information in its cache, cache manager 322 may obtain it and update it until it has no longer received a request for such information for a period of time, after which point cache manager 322 may discard the information and stop maintaining it until it receives another request for it.

Intelligence May Reside on Server or on Client Computer.

As described below, the various elements described below are located on the client computer 306, 308. However, in another embodiment, server 300 contains some or all of such elements, allowing the server to perform updates of the display. In such embodiment, display manager 340 or a browser or both may relay to a server display manager (not shown) on server 300 commands and other actions (e.g. tools being resized) performed by the user and the server display manager 300 updates the display and provides the updated web page to the client computer 306, 308 upon receipt of a command or upon a time for periodic updates elapsing.

Add to Watchlist Command Received.

Command manager 344 may receive commands made by a user, or some or all commands may be directly received by the element that will process the command as described herein. In one embodiment, display manager 340 displays the various user interfaces in such a manner to allow the operation, including receipt of commands from a user, as described herein. In one embodiment, command manager 344 receives commands from a conventional pointing device operated by the user in conjunction with a display screen, such as a conventional pointing device, which may include a mouse, trackball or touchscreen that allows the user to communicate commands by pointing to an area on the screen and clicking a mouse or tapping a screen.

One such command may be an add to watchlist command, for example by selecting an "add" link or using a pull down menu item. If the user provides such a command, command manager 344 signals symbol add manager 346 or symbol add manager 346 receives the command directly.

In response to either of such action, symbol add manager 346 either provides the user with a user interface control to supply the symbol (and the user supplies the symbol and presses a submit button), or the page provided by login manager 318 may have such a user interface control that the user fills in with the symbol before providing the command. Symbol add manager 346 receives the symbol, adds it to the watch list in local storage 332 adds it to the head of the most recently used list in local storage 332 and signals display manager 340 to update the display, and display manager 340 updates the display of each tool set instance and the small charts using the newly updated watch list and most recently used list.

It is noted that each time the display is updated as described herein, the symbol at the head of the most recently used list will be used by some or all of the tools, though some tools, such as the tool displaying the small charts or watch list will use other symbols. Thus, a tool that displays the bid and ask price of one security will display the bid and ask price for the security having the symbol at the head of the most recently used list. When the most recently used list is changed, the display will be updated so that that tool will change the display of bid and ask prices from the symbol formerly at the head of the most recently used list to the new symbol at the head of the most recently used list.

Select Symbol Command Received.

If the user selects a symbol as described herein (e.g. by selecting a small chart, for example), command manager 344 receives such selection and provides the symbol selected to symbol selection manager 348 or symbol selection manager 348 receives the symbol directly. In response, symbol selection manager 348 moves the selected symbol to the front of the most recently used list in local storage 332 and signals display manager 340, which updates the display of each tool set instance and the small charts using the newly updated most recently used list as described above.

Manage Watch List Command.

At any time, the user may provide a manage watch list command, for example, by clicking on a link or using a pull down menu item. The menu item is received by command manager 344 which transfers control to watch list manager 350, or the link may transfer control to watch list manager 350.

In response, watch list manager 350 provides a user interface that allows the user to look up and/or add a symbol to, or delete a symbol from, the watch list. Watch list manager 350 receives the symbol and the action to be taken with it (add or delete), and modifies the watch list (and optionally, the most recently used list) for the user stored in local storage 332 in accordance with the symbol and action as described above, and signals display manager 340, which provides the display of each tool set instance and the small charts using the newly changed watch list and the optionally newly changed most recently used list as described above.

Flip Command.

If the command is a command to display a tool subset that involves a flip (i.e. a flip command), such as by clicking on a tab of a tool subset that is indicated in local storage 332 as a part of a tool that is reached via a flip, such clicking on the tab or otherwise indicating the command may signal command manager 344 with an indication of the tab or other tool subset indicator clicked and command manager 344 may signal flip manager 352 with the indication, or clicking on the tab or providing the indication may provide such information directly to flip manager 352. For example, a browser may provide such indication to flip manager 352. In one embodiment, a tool subset is reached via a flip if it should be updated at each selection.

When flip manager 352 receives the indication, it retrieves the head of the most recently used list from local storage 332 and, based on the subset indicated, optionally downloads information required to display the tool subset from cache manager 332. In one embodiment, to obtain such information, flip manager 352 provides to cache manager 332 the symbol from the most recently used list and an identifier of the tool subset corresponding to the indicator, by retrieving it from a display object that contains a description of all of the tools, tool subsets, and their displayed locations and sizes, from local storage 332.

In one embodiment, cache manager 332 has previously received from a system administrator any unchanging information to be displayed as the tool subset for each tool subset. The unchanging information may be marked up to describe, or otherwise facilitate, insertion of dynamic information, such as by using a conventional markup language. Cache manager 332 provides the unchanging information for the tool subset identifier it receives and the dynamic information for the symbol it receives. Flip manager 352 stores both sets of information into local storage 332 and then integrates the dynamic information into the unchanging information in accordance with the markup of the unchanging information. The unchanging information may be information that does not change frequently, but may change occasionally, such as every few days. The dynamic information changes more frequently than that, such as every few minutes or few seconds. Other embodiments use a JAVA program or FLASH movie instead of a markup and such information is provided by cache manager 332 and then operated upon receipt by flip manager 352.

In one embodiment, cache manager 322 maintains in user information storage 320 a list of the user identifiers whose computer systems it has given each set of unchanging information, and includes the session identifier, a unique tool subset identifier and the date and time it was last provided for such session in such list. If the user with the same user identifier in the same session requests the unchanging information cache manager 332 has determined using such list that it has already provided in the same session, cache manager 332 so indicates, and only provides the dynamic information and not the unchanging information if the unchanging information has not been updated since it was last provided.

While flip manager 352 is animating the flip of the information that will be formerly displayed, it requests the information to be displayed as described above, and if all such information is received within a threshold amount of time after the animation of the rotating screen indicates an approximately 90 degree rotation as measured from above, the flip will be animated smoothly. Otherwise, flip manager 352 will pause the flip or slow it down. In one embodiment, cache manager 332 provides the number of bytes it will provide before providing the information it provides as described above. Flip manager 352 can then track the number of bytes of information received and use such number of bytes to limit the speed at which the animation of the flip occurs, thus making more likely that the flip will be smooth and not paused or run at different speeds.

Flip manager 352 then updates a display object stored in local storage 332 that indicates the tools (and if a tool has subsets, the subset) being displayed in each instance of a tool set and their positions to indicate the old tool subset is no longer displayed and the new tool subset is displayed. Flip manager 352 may signal display manager 340 to update the display as described above and display manager 340 updates the display of one or more tool set instances using the newly altered display object.

Select Tool Subset.

At any time, a user may provide a command to change the subset of a tool being displayed that does not involve a flip. The command may be received by the user clicking on a subset tab of a tool being displayed and an identifier of the tool and subset is provided from the browser to command manager 344 or to tool subset manager 354. There may be one tool subset manager 354 for each tool subset or one subset manager for all tool subsets. Command manager 344 may receive the command and provide an indication of the tool and subset to the single tool subset manager 354, which uses the tool and subset received to identify the tool and subset selected, or, if tool subset managers 354 are each dedicated to an individual tool and subset, the browser or command manager 344 may select the proper tool subset manager 354 corresponding to the user's selection based on the tool and subset identifier or user's action and signal the selected tool subset manager 354. In one embodiment, tool subset manager 354 may request and receive a downloaded tool subset from cache manager 322 in the same manner flip manager 354 and such tool is downloaded and stored into local storage 332. In other embodiments, all tool subsets reached without a flip are received with the tool, and are not downloaded when the subset is selected as described above.

Tool subset manager 354 modifies the display object in local storage to indicate that the tool subset, either corresponding to the tool subset manager 354 or corresponding to the tool and subset identifier it receives, should be displayed in the location assigned to the tool to which the subset corresponds, and signals display manager 340, which updates the display using the newly altered display object.

Multiple Instances.

As noted above, there may be multiple instances of tool sets, each instance for the same user containing a set of tools that may be or is different from those of other instances, and if multiple instances are used, there are multiple display objects, one for each instance, stored in local storage 332. Display manager 340 displays each instance of a tool set according to boundaries defined in each display object.

If there are multiple instances, tool subset manager 354 will receive an instance identifier corresponding to the instance in which the subset that is selected resides, or each of the multiple tool subset managers 354 may be bound to a particular instance of a tool set in which the tool subset corresponding to the tool subset manager 354 resides. Tool subset manager 354 will thus update the display object corresponding to the instance to which it corresponds or the instance identifier it receives.

Change Tool or Instance Boundaries.

At any time, a command may be received to change tool boundaries or the boundaries (e.g. size or location) of a tool or an instance of a tool set. As noted herein, there may be one or more instances of tool sets used by a user. A command to change tool boundaries and/or instance boundaries may be made by the user dragging borders to change a size. A command to change a location may be made by the user dragging a title bar. Command manager 344 receives commands to change locations or sizes of tools or instances, and provides such commands to tool boundary manager 356. Commands may include a corner, border or title bar that has been dragged from an old position to a new position, and the old and new positions of such item are received by command manager 356, which provides them to tool boundary manager 356.

When it receives such information, tool boundary manager 356 uses the old and new locations received and the sizes and locations of the tools defined in the display object or display objects stored in local storage 332 for each instance to identify the tool (and optionally, the instance) whose boundaries are being changed or the tool or instance whose title bar is being dragged, and updates in the corresponding display object in local storage 332 the location and size of the tool or instance in accordance with the old and new location. The locations and/or sizes of other tools may be updated, for example to maintain their adjacency with the tool whose boundaries were changed. Tool boundary manager 356 may then signal display manager 340, which updates the display using the newly updated display object or objects, by displaying tools specified at the locations and sizes specified in each display object stored in local storage 332.

Add or Subtract Tools/Instances.

At any time, a user may add or subtract a tool to any instance of a tool set, or may add or subtract an instance of a tool set. In one embodiment, to perform each of any of these functions, a menu command item provided by the operating system or a browser as specified by command manager 344 may be used. Each of the menu commands causes tool manager 358 to be signaled, and in response, tool manager 358 provides a user interface that allows the user to specify a tool to be added to, or removed from, an instance of a tool set, or to add a new instance or remove an instance other than the last remaining instance. The user can add to a tool set fewer than all tools or all tools available.

If tools are added, tool manager 358 requests and receives a description of the tools available from tool repository 324, removes from the list the tools already in any of the display objects in local storage, and displays the list to the user as a user interface that allows the user to select one or more tools to add to an instance of the one or more tool sets used to display tools. If the user selects a tool and specifies an instance, tool manager 358 downloads the tool from tool repository 324, which may be a JAVA program, FLASH movie, a conventional application, a set of marked up text as described above, or another type of tool, stores it into local storage 332 and adds the tool to the display object corresponding to the specified instance (or if there is only one instance, to the display object) in local storage 332, with a default position and size, such as a default width and height, at the bottom of the instance.

The description, default size of the tool and the tool itself may be provided to tool repository 324 by a system administrator using a user interface provided by tool repository 324 when a system administrator logs into it.

If the tool is being removed, tool manager 358 displays to the user a user interface containing a list of the tools in any display object in local storage 332 along with user interface controls such as check boxes that allow the user to indicate which of the tools the user wishes to remove from a tool set and receives the user's responses. Tool manager 358 removes any indicated tool definition from the display object, optionally changes the locations of other tools to eliminate any gaps that would result in the display due to the removed tool or tools, and signals display manager 340, which updates the display as described above using the newly updated display object or objects. The display includes the tools and small charts as described herein.

If the command is a command to add or delete an instance of a tool set, tool manager 358 displays to the user a user interface allowing the user to add or remove an instance and receives the user's response. Tool manager 358 then deletes the display objects corresponding to the instances deleted or adds a display object for the newly added instance at a default location and allows the user to move it into a desired position as described herein. Tool manager 358 signals display manager 340, which updates the display using the newly updated display object or objects.

Different Watch Lists.

As noted above, different watch lists may be used, and the watch lists will automatically (i.e. without user input at the time of any such change) change based on time of day, location or for other reasons. In this embodiment, a user may use the manage watch list menu item set up by command manager 344 or link displayed by display manager 340, either of which may signal watch list manager 350. When signaled, watch list manager 350 provides the user with the user interface as described above, and also allows the user to add additional watch lists and define the conditions under which each watch list may be used.

Conditions may include time of day, location of a user's cell phone, or both.

Watch list manager 350 stores each watch list and the conditions under which that watch list will apply into local storage 332. One watch list is designated by the user as a default watch list, one that is used if the conditions for no other watch list are in effect. When symbols are added or removed from a watch list, watch list manager 350 allows the user to indicate the watch list to which the symbol should be added, or from which the symbol should be removed.

Periodically, dynamic watch list manager 360 checks the conditions under which each watch list should be used, marks each such watch list for which current conditions match the conditions of that watch list, and unmarks any marked watch list for which the condition of the watch list does not match the current conditions. To determine whether a time of day condition applies, dynamic watch list manager 360 checks a system clock and optionally a location signal, such as may be available via a user's cellular telephone. If the user's location is outside of the time zone in which any watch list is defined, dynamic watch list manager 360 optionally adjusts the time to the time zone for which a time condition is defined. Alternately, dynamic watch list manager 360 may retrieve the time from an Internet time clock, retrieving it in a uniform format and converting any times received as conditions for watch lists into that format when it is defined, for storage in the uniform time format.

If the condition for a watch list is a location, dynamic watch list manager 360 checks the location signal (such as that provided by a GPS receiver of a user's telephone) to determine if the user is within a threshold distance of the location to which a watch list corresponds, such threshold being defined by the user. Other conditions may be used to define watch list and combinations of conditions (e.g. via a conventional OR or AND function) may be used.

Display manager 340 uses any or all marked watch lists, or if none is marked, the default watch list, when providing or updating the display as described herein.

Uploading of Local Storage Changes.

In one embodiment, as the various elements 340-360 described above change local storage 332, they also provide the encrypted user and session identifiers, and an indication of the change they make to storage update manager 312, which, after authenticating the user as described above, maintains a duplicate copy of the user's display objects, watch list and optionally, the most recently used list, in user information storage 320. When the user subsequently logs in, log in manager 318 provides a copy of these items to display manager 340, which stores them into local storage 332 for use as described herein.

Each of the elements of client computer system B 308 and server 300 is a component of a computer system coupled to an electronic storage device.

What is claimed is:

1. A method of displaying financial security information comprising:

receiving over a network and combining by a computer processor system coupled to a memory system for substantially simultaneous display on a computer screen using a first order, and repeatedly updating, a first set of at least four small charts or at least some of the information contained therein, each comprising a first type of information corresponding to a quantity of at least one security, a plurality of the at least four small charts corresponding to different securities from one another;

electronically displaying on the computer screen a second type of information about a first of the at least one security displayed in a small chart, such second type of information different from the first type displayed in said small chart and simultaneously displayed with said small chart, at least some of the second type of information having been received over the network;

receiving an indication that one of the small charts has been selected by a user using the computer screen; and responsive to the small chart selected:

receiving over a network and combining by the computer processor system coupled to the memory system for substantially simultaneous electronic display on the computer screen using a second order, and repeatedly updating, a second set of at least four small charts or at least some of the information contained therein, each comprising the first type of information, each small chart corresponding to a quantity of at least one security, a plurality of the second set of at least four small charts corresponding to different securities from one another; and outputting by the computer processor system coupled to the memory system over the network for electronic display on the computer screen the second type of information about a second of the at least one security displayed in one of the small charts in the second set of small charts, such second type of information different from the first type of information displayed in said small chart and simultaneously displayed with said small chart; and wherein either:

the securities corresponding to the small charts in the first set of at least four small charts match the securities corresponding to the small charts in the second set of at least four small charts, but the second order is different from the first order; or one of the small charts in the first set of at least four small charts corresponds to a security that is not in the second set of at least four small charts, but a remainder of the small charts have a same order relative to one another in the first set and the second set.

2. The method of claim 1, wherein the second type of information is provided for display in response to a user selecting from among the second type of information, and a third type of information about the second of the at least one security, but not a fourth type of information, the second and third type of information having been selected by the user as information to be made available, from among the second type of information, the third type of information, and a fourth type of information, said fourth type of information having been made available for said selection by the user, but not having been selected by the user.

3. The method of claim 1, wherein the second type of information is displayed having a size equal to a user-adjusted size of a display of the third set of information.

4. The method of claim 1, additionally comprising providing for display on the computer screen at substantially a same time as the second type of information is provided for display, a fifth type of information about one of the at least one security displayed in one of the small charts in the second set of small charts other than the second of the at least one security displayed in one of the small charts in the second set of small charts, the fifth type of information not user-selectable between a fifth type of information and a sixth type of information.

5. The method of claim 4, additionally comprising providing for display the fifth type of information about the second of the at least one security displayed in one of the small charts in the second set of small charts responsive to the small chart selected, the fifth type of information not user-selectable between a fifth set of information and a sixth type of information.

6. A system for displaying financial security information comprising:

a display manager comprising a processor coupled to a memory and having an input for receiving over a network a first set of at least four small charts or at least some of the information contained therein, each comprising a first type of information, each small chart corresponding to a quantity of at least one security, a plurality of the at least four small charts corresponding to different securities from one another, the display manager for substantially simultaneously providing to a user at the display manager output the at least four small charts for display on a computer screen using a first order, and repeatedly updating the display of the at least four small charts from the information received at the display manager input, and for providing at the display manager output for display to the user on the computer screen a second type of information about a first of the at least one security displayed in a small chart, such second type of information different from the first set of displayed in said small chart and simultaneously displayed with said small chart, at least some of the second type of information having been received via the network at the display manager input;

a command manager comprising a processor coupled to a memory, the command manager for receiving at an input an indication that one of the small charts has been selected by the user using the computer screen and providing an identifier of the small chart selected at an output coupled to the display manager input; and the display manager additionally for, responsive to the identifier of the small chart selected received at the display manager input:

receiving over the network at the display manager input a second set of at least four small charts or at least some of the information contained therein, each small chart comprising a first type of information, each small chart corresponding to a quantity of at least one security, a plurality of the at least four small charts corresponding to different securities from one another;

substantially simultaneously providing at the display manager output for display to the user on the computer screen the second set of at least four small charts on the computer screen using a second order, and repeatedly updating the display of the second set of small charts using information received over the network at the display manager input; and outputting by a computer processor coupled to a memory at the display manager output for display to the user on the computer screen the second type of information about a second of the at least one security displayed in one of the small charts in the second set of small charts, such second type of information different from the first type of information displayed in said small chart and simultaneously displayed with said small chart; and wherein either:

the securities corresponding to the small charts in the first set of at least four small charts match the securities corresponding to the small charts in the second set of at least four small charts, but the second order is different from the first order; or one of the small charts in the first set of at least four small charts corresponds to a security that is not in the second set of at least four small charts, but a remainder of the small charts have a same order relative to one another in the first set and the second set.

7. The system of claim 6:
additionally comprising:

a tool manager having an input coupled for receiving from the user a first selection of the second type of information and a third type of information as information to be made available, from among the second type of information, the third type of information, and a fourth type of information, said fourth type of information having been made available for said selection by the user, but not having been selected by the user, the tool manager for providing at an output an indication of the first selection of the second type of information and the third type of information; and a tool subset manager having an input coupled to the tool manager output for receiving the indication of the first selection and for receiving from the user a second selection of the second type of information from among the types of information in the first indication, the tool subset manager for providing at an output coupled to the display manager input an indication of the second selection;

and wherein the display manager provides at the display manager output for display to the user the second type of information responsive to the indication of the second selection received at the display manager input.

8. The system of claim 6:
additionally comprising a tool boundary manager having an input for receiving from the user a size of a display of the third type of information, the tool boundary manager for providing at an output coupled to the display manager input an indication of the size of the third type of information; and wherein the display manager displays the second type of information using a size responsive to the indication of the size of the third type of information received at the display manager input.

9. The system of claim 6, wherein the display manager is additionally for providing at the display manager output for display on the computer screen at substantially a same time as the second type of information is provided for display, a fifth type of information about one of the at least one security displayed in one of the small charts in the second set of small charts other than the second of the at least one security displayed in one of the small charts in the second set of small charts, the fifth type of information not user-selectable between a fifth type of information and a sixth type of information.

10. The system of claim 9, wherein the display manager is additionally for providing at the display manager output for display to the user the fifth type of information about the second of the at least one security displayed in one of the small charts in the second set of small charts responsive to the small chart selected, the fifth type of information not user-selectable between a fifth type of information and a sixth type of information.

11. A computer program product comprising a non-transitory computer useable medium having computer readable program code embodied therein for displaying financial security information, the computer program product comprising computer readable program code devices configured to cause a computer system to:

receive over a network and combine by a first computer processor coupled to a first memory for substantially simultaneous electronic display on a computer screen using a first order, and repeatedly update, a first set of at least four small charts or at least some of the information contained therein, each comprising a first type of information corresponding to a quantity of at least one security, a plurality of the at least four small charts corresponding to different securities from one another;

electronically display on the computer screen a second type of information about a first of the at least one security displayed in a small chart, such second type of information different from the first type of displayed in said small chart and simultaneously displayed with said small chart, at least some of the second type of information having been received over the network;

receive an indication that one of the small charts has been selected by a user using the computer screen; and responsive to the small chart selected:

receive over a network and combine by a computer processor system coupled to a memory system for substantially simultaneous display on the computer screen using a second order, and repeatedly updating, a second set of at least four small charts or at least some of the information contained therein, each comprising the first type of information, each small chart corresponding to a quantity of at least one security, a plurality of the second set of at least four small charts corresponding to different securities from one another; and output by the computer processor system coupled to the memory system over the network for electronic display on the computer screen the second type of information about a second of the at least one security displayed in one of the small charts in the second set of small charts, such second type of information different from the first type of information displayed in said small chart and simultaneously displayed with said small chart; and wherein either:

the securities corresponding to the small charts in the first set of at least four small charts match the securities corresponding to the small charts in 60 the second set of at least four small charts, but the second order is different from the first order; or one of the small charts in the first set of at least four small charts corresponds to a security that is not in the second set of at least four small charts, but a remainder of the small charts have a same order relative to one another in the first set and the second set.

12. The computer program product of claim 11, wherein the second type of information is provided for display in response to a user selecting from among the second type of information, and a third type of information about the second of the at least one security, but not a fourth type of information, the second and third type of information having been selected by the user as information to be made available, from among the second type of information, the third type of information, and a fourth type of information, said fourth type of information having been made available for said selection by the user, but not having been selected by the user.

13. The computer program product of claim 11, wherein the second type of information is displayed having a size equal to a user-adjusted size of a display of the third type of information.

14. The computer program product of claim 11, additionally comprising the computer readable program code devices configured to cause the computer system to provide for display on the computer screen at substantially a same time as the second type of information is provided for display, a fifth type of information about one of the at least one security displayed in one of the small charts in the second type of small charts other than the second of the at least one security displayed in one of the small charts in the second set of small charts, the fifth type of information not user-selectable between a fifth type of information and a sixth type of information.

15. The computer program product of claim 14, additionally comprising the computer readable program code devices configured to cause the computer system to provide for display the fifth type of information about the second of the at least one security displayed in one of the small charts in the second set of small charts responsive to the small chart selected, the fifth type of information not user-selectable between a fifth type of information and a sixth type of information.

\* \* \* \* \*